July 15, 1952     B. O. CREMEENS     2,603,098
SUCKER ROD ROTATOR
Filed May 17, 1950
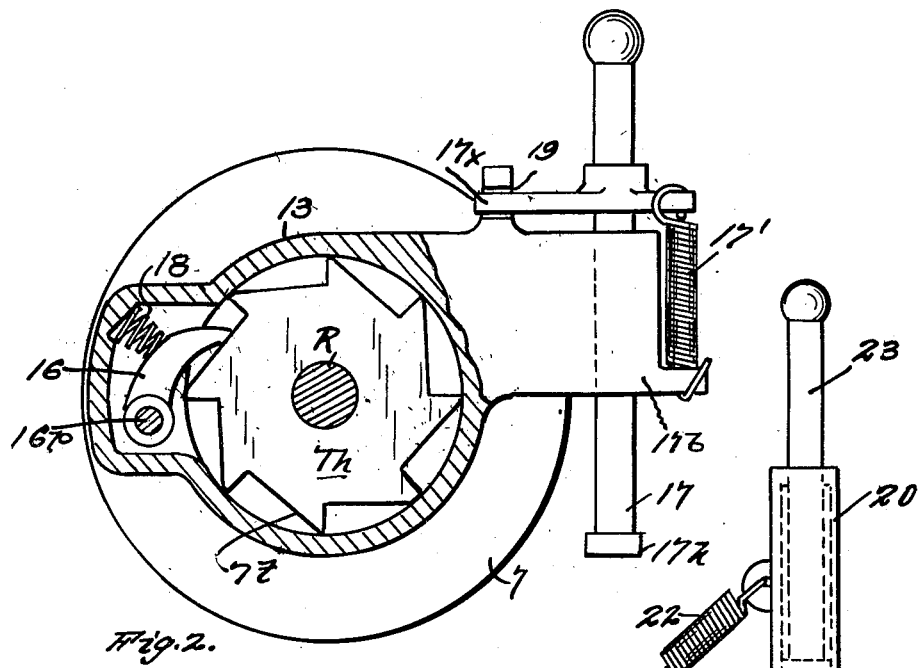
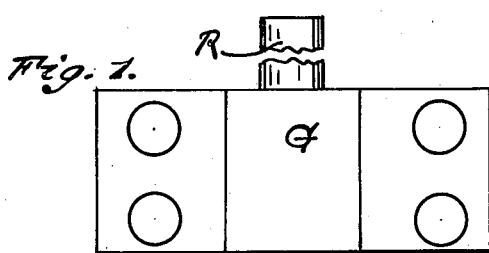
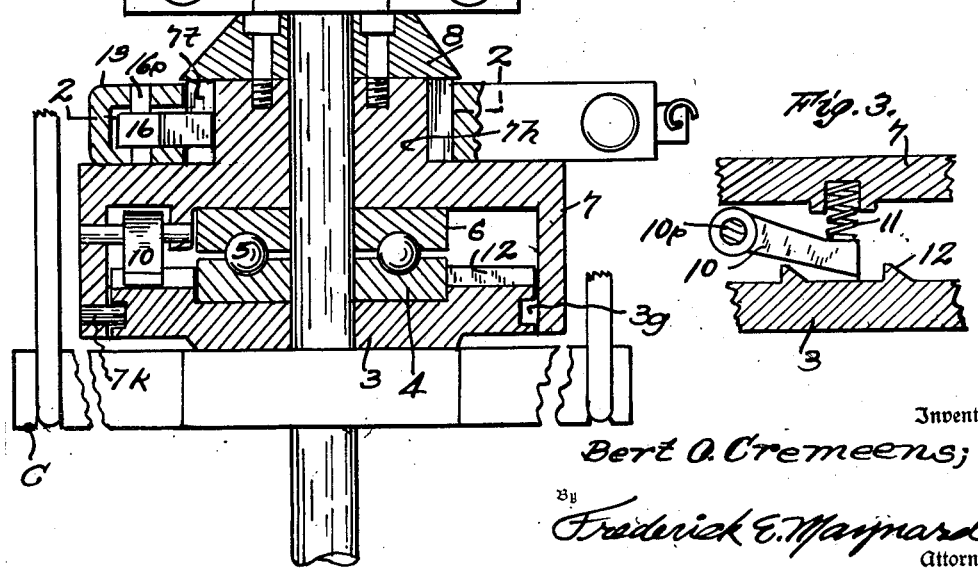
Inventor,
Bert O. Cremeens;
By Frederick E. Maynard,
Attorney.

Patented July 15, 1952

2,603,098

UNITED STATES PATENT OFFICE 2,603,098

SUCKER ROD ROTATOR

Bert O. Cremeens, Whittier, Calif.

Application May 17, 1950, Serial No. 162,417

3 Claims. (Cl. 74—142)

This invention is an improved sucker rod rotator. What has long been known in the oil fields as a "Cremeens" rod rotor includes a housing enclosing a ratchet mechanism whereby to rotate an installed sucker rod step by step by means of an unattached capstan bar.

A serious objection to the unattached bar is that it is soon lost at a pumping station or platform and to pick up another bar or handle of proper fit is not so easy, and time is lost in shaping a suitable handle, besides the incidental expense.

It is a purpose of this invention to provide a handle device that is not only always in attached position on the rotator and cannot be readily removed and then lost, but, additionally involves a ratchet handle of extensible effective length.

Further, a purpose is to provide an extensible handle including means for retaining it in its retracted or shortened position, and also to provide means for automatically retracting the handle to ineffective and reduced-hazard position.

The invention resides in certain advancements in this art as set forth in the ensuing disclosure and having, with the above, additional objects and advantages as hereinafter developed, and whose construction, combinations and details of means and the manner of operation will be made manifest in the following description of the herewith illustrative apparatus; it being understood that modifications, variations, adaptations and equivalents may be resorted to within the scope, spirit and principles of the invention as it is claimed in conclusion hereof.

Figure 1 is a partial axial section and elevation of the rotator in position on a polish, pump rod. Figure 2 is a horizontal section on line 2—2, Fig. 1. Figure 3 is a detail section showing the reverse lock pawl in elevation. Figure 4 is a side view of a modified form of handle device.

It is desirable that the sucker rod R and its attached parts in a well be rotated at intervals so as to change the incidental zones of bearing on other stationary equipment or pump parts during pump operation by the sucker rod. That is, prevent all wear taking place along non-changing contact zones of friction on the load carrying rod. It is to be understood that the instant invention is not limited to use on pump apparatus alone.

The invention is here combined with such a rod R, the rotation of which will turn all of its suspended attachments and change the friction zones thereof also.

The rod is vertically reciprocated by and with a cross-piece or carrier C on which rests a saddle disc 3 in which the rod R can rotate and reciprocate. In this disc is seated a lower ball race 4 having balls 5 on which sits an upper race 6; all loose on the axial rod R. Supported on the upper race 6 is a rotary capstan housing 7 which is free on the rod. Fixed on the top of the housing is a cap 8 having for one purpose to support an imposed and suitable polish rod clamp G which imposes the full load of the reciprocative rod and its fixtures onto the rotator. The friction between the carrier C and the race saddle disc 3 fully suffices to keep the disc from rotating on the carrier C. Therefore, rotation of the housing on the ball bearing will rotate the said clamp G and its gripped polish rod R and its string of well parts (not shown).

A means to prevent reverse rotation of the housing 7 includes a dog 10 pivoted at 10p in the skirt of the housing and it is pressed down by a spring 11, seated in the housing, so as to press back against one or another of a ring of saddle teeth 12. The skirt of the housing has one or more keys 7k toeing in a rim groove 3g of the saddle disc to keep these parts assembled. Thus the housing can rotate only to the right (looking down) Fig. 2.

Means to actuate, that is rotate, the housing on the saddle disc includes a collar 13 bored to freely fit and turn on a ratchet-tooth housing hub 7h covered by the cap 8. Pivoted at 16p in the collar is a horizontally swinging pawl 16 pressed by a spring 18 to effectively engage any one of the hub teeth 7t when the collar is rotated to the right and thus rotate the polish rod housing 7 and the rod R by way of the clamp G. Reverse turn of the housing and the rod is prevented by the lock dog 10.

To effect oscillation of the ratchet collar it is desirable that ample leverage be instantly available and yet that the lever be of such embodiment and mounting on the collar that the lever will not be objectionally obtrusive laterally from the housing 7. This is possible by divers lever means. Fig. 2 shows a one-piece round bar 17 sliding and oscillative in a tangential boss 17b, of the collar, having a top seat 19. The handle bar has a stop head 17h on its inner end and a side lug 17x which, when the bar is in its idle, retracted position, Fig. 2, will latch into the boss seat 19. If desired a tension spring 17' may be used to hitch the bar to the said boss and automatically retract the bar; in such case the seat 19 could be omitted. By merely pulling outwardly on the bar 17 ample turning leverage on the collar is available.

A modified sectional handle device is shown in Fig. 4 wherein a socket member 20 is pivoted at 21 on a side of the collar 15 and is normally pulled to upright, safety position by a tension spring 22. A handle bar 23 is telescopically fitted in the socket for instant extension when it is desired to manually oscillate the actuating collar of the housing.

I claim:

1. A reciprocating pump rod and a rod rotator having, in combination, a saddle to rest on a reciprocative carrier, a capstan housing rotatably mounted on the saddle and reciprocative therewith the saddle and the housing having means interlocking them for reciprocative movement together, means to prevent rotation of the housing in one direction on the saddle, a capstan collar rotative on the housing, a ratchet device operative by the collar to rotate the housing in its free capacity on the saddle, and a manual handle device for the ratchet device, and means on the housing for fixing the collar to the housing against other than a swivel action only, and a clamp on the rod for abutment by the housing.

2. The rotator of claim 1; the ratchet device including a yieldable pawl operatively mounted on the collar.

3. The rotator of claim 2, and a ball bearing interposed between the housing and the saddle.

BERT O. CREMEENS.

REFERENCES CITED

The following references are of record in the file of this patent:

UNITED STATES PATENTS

| Number | Name | Date |
|---|---|---|
| 210,669 | Coates | Dec. 10, 1878 |
| 726,129 | Willing et al. | Apr. 21, 1903 |
| 1,330,260 | Graham | Feb. 10, 1920 |
| 1,574,518 | Sargent | Feb. 23, 1926 |
| 1,623,696 | Nugent | Apr. 5, 1927 |